April 8, 1930. A. T. WOODS 1,753,815
MEAT FORK
Filed May 11, 1929
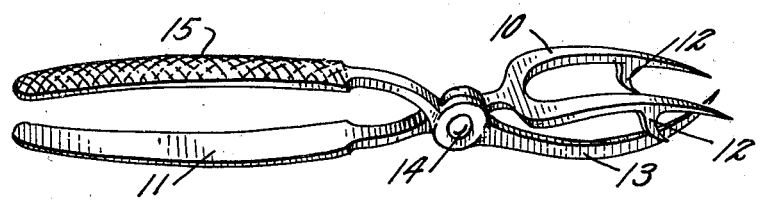
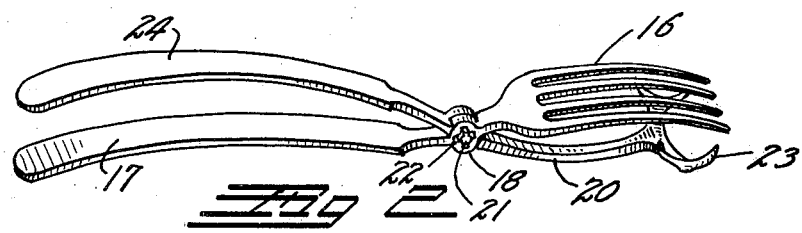
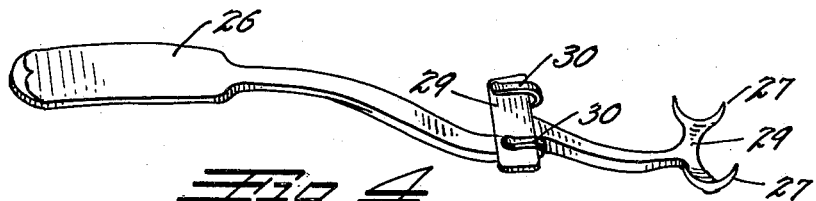
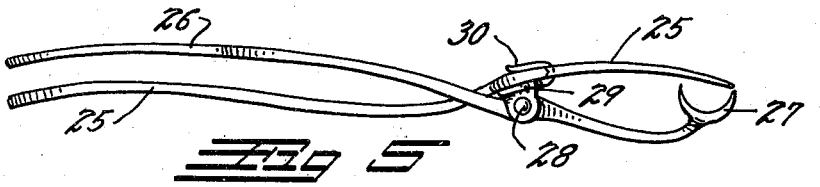
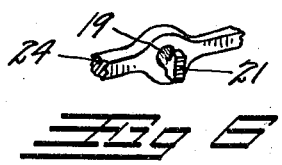
Inventor
ALBERT T. WOODS
By
Attorney Patented Apr. 8, 1930

1,753,815

UNITED STATES PATENT OFFICE

ALBERT T. WOODS, OF PLACERVILLE, COLORADO

MEAT FORK

Application filed May 11, 1929. Serial No. 362,189.

This invention relates to dinner forks and to forks of the type used for serving and carving meat. With the present type of forks it is exceedingly difficult to hold tender meats and fowls sufficiently secure for meat carving. The principal object of this invention is to provide a bone gripping device upon the fork which will hold the meat, so that the carving can be neatly executed.

It is exceedingly difficult for a diner to cut the meat away from the bones of fowls and is a disagreeable and messy undertaking to hold the bones in the fingers. Another object of this invention is to provide means in connection with a dinner fork whereby a bone may be gripped and securely held so that the meat may be eaten therefrom without soiling the fingers.

A further object of the invention is to construct a special dinner fork in which the bone gripping attachment can be detached for washing and to allow the fork to be used for ordinary purposes.

A still further object of the invention is to adapt the device for attachment to ordinary dinner forks.

Other objects and advantages reside in the detail construction of the invention, which is designed for simplicity, economy, and efficiency. These will become more apparent from the following description.

The invention adapts itself to a variety of different forms all of which will embody the same basic principle.

In the drawing I have illustrated several of these forms.

Fig. 1 illustrates the invention embodied in a special carving or serving fork.

Fig. 2 illustrates a second form of the device in which the bone gripping portion is detachable from the fork proper.

Fig. 3 is a side elevation of the bone gripping attachment of Fig. 2.

Fig. 4 illustrates an attachment arranged to be attached with an ordinary dinner fork when needed.

Fig. 5 is a side elevation illustrating the attachment of Fig. 4 combined with an ordinary dinner fork.

Fig. 6 is a detail view illustrating the pivot pin employed in the detachable variety of Fig. 2.

Referring to Fig. 1, a tined meat fork is illustrated at 10, provided with a handle 11. The fork 10 carries an outwardly projecting fang 12 on each of its tines. A bone hook 13 is hinged on a pivot pin 14 upon the handle 11 and is provided with a handle 15 which co-operates with the handle 11.

In use the tines 11 will be either forced into the meat or placed alongside of a bone thereof with the fangs 12 engaging one side of the bone. The handles 11 and 15 are then compressed to bring the bone hook 13 against the other side of the bone so as to force it into the pocket formed between the tines and the fangs. This will provide the user with a firm and secure grip upon the bone so that carving may be done with precision and safety.

The device of Fig. 2 comprises a tined fork 16 provided with a handle 17 and a hinge boss 18. The hinge boss 18 is pierced by a slotted opening for the reception of a pivot pin 19 carried on a bone gripping attachment 20. The pivot pin 19 is formed with an elongated head 21 as illustrated in Fig. 6 so that when the bone gripping attachment is placed laterally of the handle 17 the pivot pin will pass through the elongated opening 22 in the boss 18 and when the attachment is turned to the operative position the head 21 will turn out of alignment with the opening 22 so as to securely lock the two parts together.

The bone gripping attachment is shown in detail in Fig. 3 and is provided with bone hooks 23 at its one extremity and a handle 24 at its other extremity.

The operation of the device is similar to the previously described form. It can, however, be taken apart so that the fork can be easily cleaned or used as an ordinary fork.

It will be noted that the two handles 17 and 24 are curved in the same direction so that when they are in the closed position they will fit substantially together to form a common handle. The device of Fig. 1 might also, if desired, have its handles similarly curved.

Figs. 4 and 5 illustrate a form of the invention arranged for attachment to an ordinary dinner fork such as illustrated at 25, Fig. 5. It comprises a bone gripping member having a handle portion 26 at its one extremity and bone hooks 27 at its other extremity. Intermediate the extremities, the attachment is pivoted as indicated at 28, upon a plate 29 provided with attachment hooks 30.

This device can be placed alongside of the plates of the diners with the other dinner utensils and if fowl or similar meats are served the diner can place the plate 29 upon the front of the fork 25 engaging the hooks 30 between the tines thereof, as illustrated in Fig. 5. This will place the bone hooks 27 in position to operate against the fork tines when the handle 26 is compressed against the fork.

The bone hooks of the latter forms are slightly different from that shown in Fig. 1. They comprise a lateral head 31 which carries the hooks as U-shaped claws upon its extremities.

While a specific form of the improvements has been described and illustrated herein, it is desired to be understood that the same may be varied, within the scope of the appended claims, without departing from the spirit of the invention.

Having thus described the invention, what I claim and desire secured by Letters Patent is:—

1. A bone gripping fork comprising: a tined fork member, a handle on said fork member, a bone hook pivoted to said fork member and a handle on said bone hook arranged to cause said bone hook to approach said fork member when said latter handle is clamped toward said first handle.

2. A bone gripping fork comprising: a tined fork member; a bone hook pivoted to said fork member and arranged to clamp a bone against the tines thereof; and fangs projecting from said tines and arranged to form a socket for the reception of said bone.

3. A bone gripping fork comprising: a tined fork member; a bone hook arranged across said fork member; means for pivoting the said two members together at their crossing point; fangs projecting outwardly and forwardly in parallel relation from said tines so as to prevent a bone from moving along said tines toward said crossing point as said bone hook forces a bone against said fangs.

4. A bone gripping fork comprising: a pair of tines; a handle extending from said pair; a projection on each of said tines, said projections extending outwardly and forwardly in parallel relation to form a bone socket on one face of said fork; a bone hook pivoted to said handle and curved forwardly and inwardly so as to force a bone into said socket, said bone hook passing between said pair of tines; and a handle extending from said bone hook, said handles being arranged so that when forced together they will cause said bone hook to approach said fork.

In testimony whereof, I affix my signature.

ALBERT T. WOODS.